United States Patent
Jones et al.

(10) Patent No.: US 9,436,895 B1
(45) Date of Patent: Sep. 6, 2016

(54) METHOD FOR DETERMINING SIMILARITY OF OBJECTS REPRESENTED IN IMAGES

(71) Applicant: Mitsubishi Electric Research Laboratories, Inc., Cambridge, MA (US)

(72) Inventors: Michael Jones, Belmont, MA (US); Tim Marks, Newton, MA (US); Ejaz Ahmed, Hyattsville, MD (US)

(73) Assignee: Mitsubishi Electric Research Laboratories, inc., Cambridge, MA (US)

( * ) Notice: Subject to any disclaimer, the term of this patent is extended or adjusted under 35 U.S.C. 154(b) by 0 days.

(21) Appl. No.: 14/678,102

(22) Filed: Apr. 3, 2015

(51) Int. Cl.
*G06K 9/00* (2006.01)
*G06K 9/66* (2006.01)
*G06K 9/62* (2006.01)

(52) U.S. Cl.
CPC .............. *G06K 9/66* (2013.01); *G06K 9/6256* (2013.01)

(58) Field of Classification Search
None
See application file for complete search history.

(56) References Cited

U.S. PATENT DOCUMENTS

| | | | |
|---|---|---|---|
| 8,452,096 B2 | 5/2013 | Doretto et al. | |
| 9,286,524 B1* | 3/2016 | Mei | G06K 9/00798 |
| 2013/0163819 A1 | 6/2013 | Hollander et al. | |
| 2015/0278642 A1* | 10/2015 | Chertok | G06N 3/02 382/156 |
| 2015/0339571 A1* | 11/2015 | Krizhevsky | G06N 3/063 382/158 |
| 2016/0098844 A1* | 4/2016 | Shaji | G06T 9/002 382/156 |
| 2016/0104058 A1* | 4/2016 | He | G06F 17/30247 382/156 |

OTHER PUBLICATIONS

Li et al. (DeepReID: Deep Filter Pairing Neural Network for Person Re-Identification), Computer Vision Foundation, 2014, pp. 1-8.*
Y. Yang, J. Yang, J. Yan, S. Liao, D. Yi, and S. Li., "Salient color names for person re-identification" in ECCV, 2014.
Z. Zhang, Y. Chen, and V. Saligrama, "A novel visual word co-occurrence model for person re-identification" in ECCV Workshop on Visual Surveillance and Re-identification, 2014.
R. Zhao, W. Ouyang, and X. Wang, "Learning mid-level filters for person re-identification" in CVPR, 2014.
M. Koestinger, M. Hirzer, P. Wohlhart, P. Roth, and H. Bischof, "Large scale metric learning from equivalence constraints" in CVPR, 2012.
W. Li and X. Wang, "Locally aligned feature transforms across views" in CVPR, 2013.
N. Martinel, C. Micheloni, and G. Feresti, "Saliency weighted features for person re-identification" in ECCV Workshop on Visual Surveillance and Re-identification, 2014.
Z. Li, S. Chang, F. Liang, T. Huang, L. Cao, and J. Smith, "Learning locally-adaptive decision functions for person verification" in CVPR, 2013.

* cited by examiner

*Primary Examiner* — Daniel Mariam
(74) *Attorney, Agent, or Firm* — Gene Vinokur; James McAleenan; Hironori Tsukamoto

(57) ABSTRACT

A method re-identifies objects in a pair of images by applying a convolutional neural network (CNN). Each layer in the network operates on an output of a previous layer. The layers include a first convolutional layer and a first max pooling layer to determine a feature map, a cross-input neighborhood differences layer to produce neighborhood difference maps, a patch summary layer to produce patch summary feature maps, a first fully connected layer to produce a feature vector representing higher order relationships in the patch summary feature maps, a second fully connected layer to produce two scores representing positive pair and negative pair classes, and a softmax layer to produce positive pair and negative pair probabilities. Then, the positive pair probability is output to signal whether the two images represent the same object or not.

17 Claims, 2 Drawing Sheets

METHOD FOR DETERMINING SIMILARITY OF OBJECTS REPRESENTED IN IMAGES

FIELD OF THE INVENTION

This invention relates generally to computer vision and camera surveillance, and more particularly to determining a similarity of objects, such as persons, in images.

BACKGROUND OF THE INVENTION

In many computer vision applications, such as camera surveillance, it is necessary to determine whether persons, or other objects, represented in different images are the same or not. When the objects are persons, this is known in the art as person re-identification. For person re-identification, the images can be cropped regions of still images, or cropped regions of frames in a video, that contain all or a part of a body of a person. In surveillance and other applications in which persons are tracked in videos, the problem of determining whether different tracks are of the same person naturally arises. This problem can be solved by comparing the cropped image regions from one of the tracks to those from a different track and determining whether the regions represent the same person or not. The images or tracks may be from the same camera at different points in time, or from different cameras at either the same point in time or different points in time.

Typically, methods for person re-identification include two components: a method for extracting features from images, and a metric for comparing the features extracted from different images. The focus in person re-identification research has been on improving the features or improving the comparison metric or both. The basic idea behind improving the features is to determine features that are at least partially invariant to changes in lighting, pose, and viewpoint. Typical features used in past methods include variations on color histograms, local binary patterns, Gabor features, salient color names, and local image patches.

To improve the comparison metric, metric learning approaches determine a mapping from an original feature space into a new space in which feature vectors extracted from two different images of the same person are "closer" (more similar) than feature vectors extracted from two images that are of two different people. Metric learning approaches that have been applied to re-identification include Mahalanobis metric learning, locally adaptive decision functions, saliency-weighted distances, local Fisher discriminant analysis, marginal Fisher analysis, and attribute-consistent matching.

Some methods use a deep learning approach for person re-identification. One such deep learning approach uses a "Siamese" convolutional neural network (CNN) for metric learning Siamese CNNs learn a non-linear similarity metric by repeatedly presenting pairs of images from a training set, along with a training label for each pair indicating whether the two images in the pair are images of the same person or of two different persons.

In one previous method, the Siamese architecture includes three independent convolutional networks that act on three overlapping parts of the two images. Each part-specific network includes two convolutional layers with max pooling, followed by a fully connected layer. The fully connected layer produces an output vector for each image, and the two output vectors are compared using a cosine function. The cosine outputs for each of the three parts are then combined to obtain a similarity score.

Another deep learning method uses a differential network. The differential architecture begins with a single convolutional layer with max pooling, followed by a patch-matching layer that multiplies convolutional feature responses from the two inputs at a variety of horizontal offsets. The response to each patch in one image is multiplied separately by the response to every other patch sampled from the same horizontal strip in the other image. This is followed by a max-out grouping layer that outputs the largest patch match response from each pair of patches in the horizontal strip, followed by another convolutional layer with max pooling, followed by a fully connected layer with 500 units and finally a fully connected layer with 2 units representing "same" or "different". A softmax function is used to convert these final 2 outputs to probabilities.

SUMMARY OF THE INVENTION

Training and test data for person re-identification are typically arranged into pairs of images. A positive pair consists of two different images of the same person, while a negative pair consists of two images of different persons. For re-identification of objects, we use the term positive pair to refer to two different images of the same object, or alternatively to two images of different objects from the same object class. Likewise, we use the term negative pair to refer to two images that depict different objects, or alternatively that depict objects from two different object classes. For example, for re-identification of cars, a positive pair might be defined as two different images of cars of the same make, model, and year.

The method concurrently learns features and a corresponding similarity metric for object or person re-identification in a pair of images. The method uses a deep convolutional neural network (CNN) with layers specially designed to address the problem of person re-identification. It is understood that "deep" is a descriptive term of art in the field of machine learning techniques, and not relative. In a preferred embodiment, the invention uses 11 layers, which is deeper than conventional CNNs that have previously been applied to the problem of person re-identification with, e.g., 5-9 layers.

Given the pair of images, the network outputs a similarity value indicating whether the two input images are a positive pair or a negative pair. Novel elements of the network include a layer that determines cross-input neighborhood differences, which characterizes local relationships across the two images among mid-level features that were extracted separately from the two images. A high-level summary of the outputs of this layer is determined by another novel layer that produces patch summary features, which are then spatially integrated in subsequent layers.

The method significantly outperforms the state of the art on larger data sets. For example, on the CUHK03 Person Re-identification Dataset, the previous state of the art was a deep learning approach that achieved a rank-1 identification rate of 20.65%. In contrast, the method achieves a rank-1 recognition rate of 54.74%, which is more than 2.5 times better performance than the previous state of the art. The method is also resistant to overfitting. By learning on a larger data set before fine-tuning on an unrelated small target data set, the network can also achieve results comparable to the state of the art even on a small data set, such as the dataset for Viewpoint Invariant Pedestrian Recognition (VIPeR).

The deep neural network architecture has unique layers that are designed specifically for the problem of re-identification. It is understood that the specific numerical sizes of network elements such as blocks, filters, strides, and numbers of feature maps, are intended as examples to illustrate the invention by way of particular embodiments of the invention, and that embodiments of the invention are not limited to using elements with the example sizes presented.

The input to the neural network is two color images. The network architecture begins with four layers: a layer of tied convolution followed by a layer of max pooling, followed by another layer of tied convolution followed by max pooling. These layers allow the network to learn a set of features that can be used to compare the two images. The network weights in these two convolutional layers are constrained to be the same (tied) for both images, which means that the same set of filters is applied to both images.

The next layers are a set of two novel network layers specifically designed for the problem of re-identification. The first novel layer accumulates differences in features between the two images around a neighborhood of each feature location, and produces a set of neighborhood difference maps. The neighborhood difference maps are made up of blocks of feature differences. The size of each block (e.g., 5×5) is a size of the neighborhood in which the differences are computed.

Next, a novel patch summary layer summarizes the neighborhood difference maps by producing a holistic representation of the differences in each 5×5 block. This is accomplished by convolving the neighborhood difference maps with filters of size 5×5 and a stride of 5, so that the result is a vector of summary values for each block. The summary values are determined from a linear combination of the 5×5 neighborhood difference values in a block.

After these two specially designed network layers, a following convolutional layer convolves the resulting patch summary feature maps with 3×3 linear filters, followed by a layer of max pooling. These two layers allow the network to learn higher-level patterns of neighborhood difference maps that help indicate whether the two input images represent the same person or not.

Next, the neural network architecture uses a fully connected layer with many units, which allows the network to learn higher-order relationships. The resultant feature vector is passed through a rectified linear unit (ReLu), and then passed through another fully connected layer with two outputs that represent positive pair and negative pair scores. Finally these two scores are passed through a softmax layer that yields probabilities for positive pair (same person) and negative pair (different person) classes.

A rectified linear unit, as known in the art, passes each real number input through a function $f(x)=\max(0, x-k)$, where $k$ is a constant parameter that may be learned.

DETAILED DESCRIPTION OF THE PREFERRED EMBODIMENTS

Figure 1:
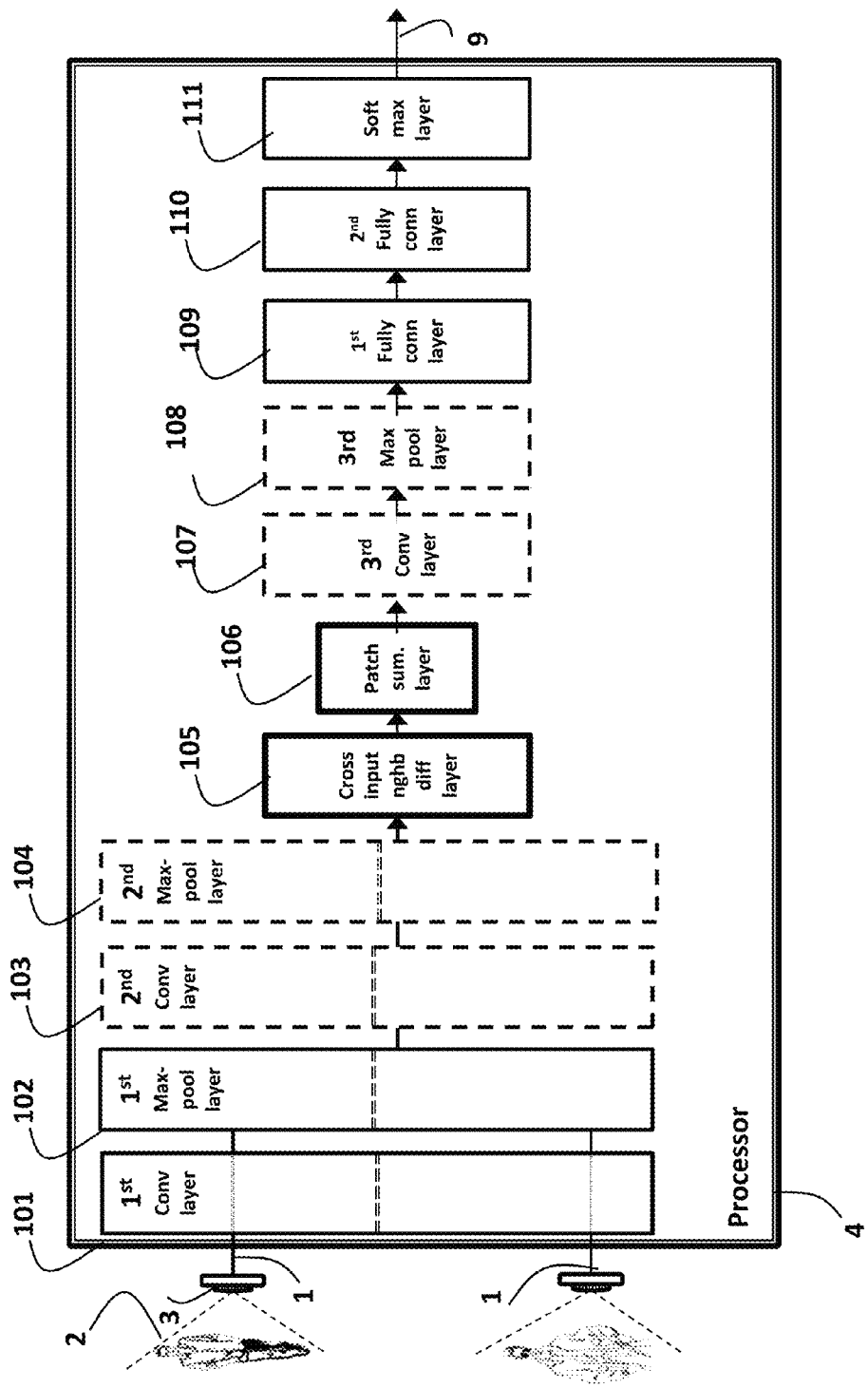
FIG. 1 is a block diagram of a method and convolutional neural network (CNN) for re-identification according to a preferred embodiment of the invention.
Figure 2:
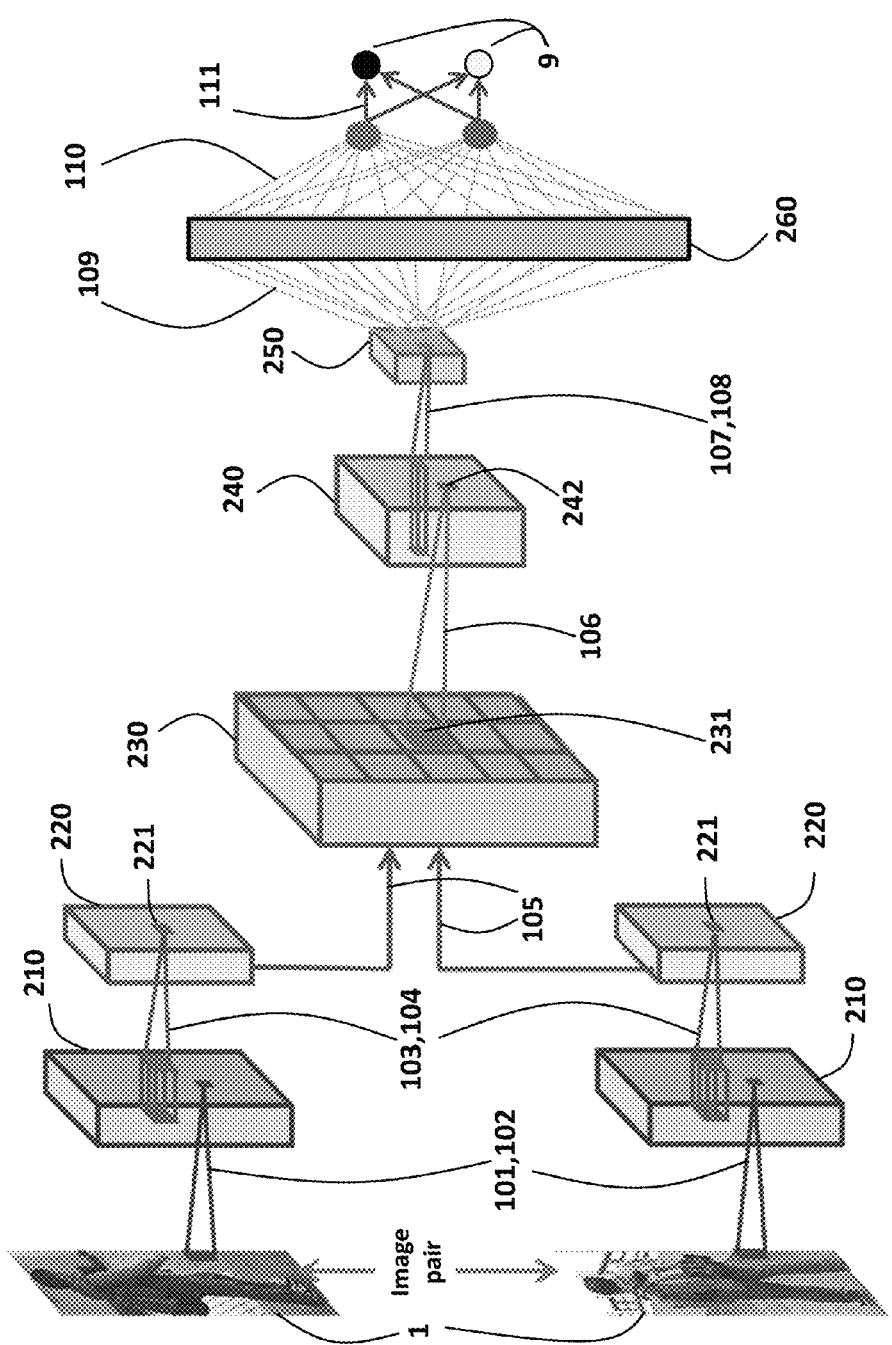
FIG. 2 is a schematic of the CNN architecture according to a preferred embodiment of the invention that shows in more detail the features at each layer of the network.

As shown in FIGS. 1 and 2, the embodiments of our invention provide a method for person re-identification in a pair of images 1 obtained of one or two persons 2. The pair of images can be acquired by cameras 3. The cameras can be still cameras or video cameras. The cameras can be the same camera (in which case the images are acquired at different times), or different cameras. The method uses a deep convolutional neural network (CNN) with layers specially designed to address the problem of person re-identification. It should be understood that the method can be applied to other objects.

FIG. 1 shows an overview of the method which can be performed in a processor 4 connected to memory for storing the pair of obtained images, and input/output interface by buses as known in the art. Basically, the method transforms a representation of persons in the pair of images into a signal 9 that indicates whether the two images are of the same person or not.

FIG. 2 is a schematic of the CNN architecture that shows in more detail the connections between novel layers for person re-identification according to embodiments of the invention. The exact sizes of the input regions for each convolution in the network can be varied depending on the desired speed and accuracy required for a particular application.

To determine whether the two images 1 are of the same person, we determine a relationship between the two images. In deep learning, convolutional features provide representations that are useful for a variety of classification tasks.

As shown in FIG. 1 for the method according to the invention, a convolutional neural network is applied to the pair of images 1 to generate the signal 9.

The convolutional neural network includes, in order, the following layers:
a first convolutional layer 101;
a first max pooling layer 102;
a second convolutional layer 103;
a second max pooling layers 104;
a cross-input neighborhood difference layer 105;
a patch summary layer 106;
a third convolutional layer 107;
a third max pooling layer 108;
a first fully connected layer with many units 109;
a second fully connected layer with two units 110; and
a softmax layer 111.

The layers 101-104 are divided into two separate parts, one for each input image 1. The layer 101 acts on each input image 1 separately, then each layer 102-104 is applied to the output of the previous layer. Layer 105 takes as input the two feature maps (one corresponding to each input image) output by layer 104 and provides input to the next layer 105. Each layer 106-111 is applied to the output of the previous layer.

The layers outlined by "dashed" boxes, layers 103-104 and 107-108, are optional to achieve a more accurate result. In other words, the layers 103-104 and 107-108 refine the features output by the layers that precede them, to produce higher-level features that can represent more complex patterns. The layers outlined in "bold," layers 105 and 106, are novel layers.

The layers 101 and 103 of our network are convolutional layers, which we use to determine higher-order features separately for each of the two images. A convolutional layer applies the same convolution (element-wise multiplication of many rectangular input regions by the same rectangular weight matrix) to each rectangular region of its input. The output is a weighted linear combination of inputs for each rectangular region.

The layers 102 and 104 perform max pooling, which reduces a size of the features. The max pooling layer takes small rectangular regions from the output of the previous layer and for each region outputs a single value: the maximum value for the region. This results in subsampling of the output of the previous layer and yields a smaller number of outputs.

In order for the features from the two images to be comparable in later layers, we perform tied convolution, in which weights are shared across the two images, to ensure that the same filters are applied to each of the two images to determine the features for each image.

FIG. 2 schematically shows some of the data structures used by embodiments of the invention. For simplicity of the figure, each pair of convolutional and subsequent max pooling layers is shown as a single layer. Image pairs that are processed by the network can include negative pairs (images of different people), and positive pairs (images of the same person). The network processes one pair of images at a time. The first convolutional layer 101 passes pixels from a pair of red, green, blue (RGB) images 1, e.g., a 60×160 RGB image (a 60×160×3 data structure), through, e.g., 20 learned filters of, e.g., size 5×5×3. Thus, the output of the first convolutional layer is a set of 20 convolved images of, e.g., size 56×156. These are passed through the first max-pooling layer 102, which halves the width and the height of features by taking the maximum of each non-overlapping 2×2 block of the 20 convolved images output from the first convolutional layer 101. This yields for each input image a set of 20 feature maps 210, each of, e.g., size 28×78.

These feature maps 210 are passed through the second convolutional layer 103, where we use, e.g., 25 learned filters of, e.g., size 5×5×20, to yield for each input image a set of 25 feature maps of, e.g., size 24×74. This is followed by the second max-pooling layer 104 that again decreases the width and height of the feature maps by a factor of 2. At the end of these first four feature computation layers (the two successive groups of tied convolution and max-pooling layers), each input image is represented by 25 feature maps 220 of, e.g., size 12×37.

Cross-Input Neighborhood Differences

As described above, the initial feature computation layers provide a set of 25 feature maps for each input image 1 in the pair of input images, from which we can learn relationships between the two images. Let $f_i$ and $g_i$, respectively, represent the $i^{th}$ feature map ($1 \leq i \leq 25$) from the first and second images.

The cross-input neighborhood differences layer 105 accumulates differences in feature values around a neighborhood of each feature location across the two images and produces a set of 25 neighborhood difference maps $K_i$. To create the neighborhood difference maps, we compute the difference between the value at each location of one feature map (e.g., $f_i$) and each pixel in a surrounding neighborhood of the corresponding feature map ($g_i$). Because the feature maps $f_i$, $g_i \in \mathbb{R}^{12 \times 37}$, the corresponding neighborhood difference map will have dimensions $K_i \in \mathbb{R}^{12 \times 37 \times 5 \times 5}$, where 5×5 is the size of the square neighborhood. Each $K_i$ is a 12×37 grid of 5×5 blocks, in which the block indexed by (x, y) 231 is denoted $K_i(x,y) \in \mathbb{R}^{5 \times 5}$, where x, y are integers ($1 \leq x \leq 12$ and $1 \leq y \leq 37$). More precisely, $$K_i(x,y) = f_i(x,y) \mathbb{1}(5,5) - N[g_i(x,y)], \quad (1)$$

where $f_i(x, y)$ is the element at location (x, y) 221 of the feature map $f_i$, $\mathbb{1}(5,5) \in \mathbb{R}^{5 \times 5}$ is a 5×5 matrix in which every element is 1, $N[g_i(x,y)] \in \mathbb{R}^{5 \times 5}$ is the 5×5 neighborhood of $g_i$ centered at (x, y).

The 5×5 matrix $K_i(x, y)$ 231 is the difference of two 5×5 matrices, in the first of which every element is a copy of the scalar $f_i(x,y)$, and the second of which is the 5×5 neighborhood of $g_i$ centered at (x, y). The motivation behind taking differences in a neighborhood is to increase the ability to handle positional differences in corresponding features of the two input images 1.

Because the operation in equation (1) is asymmetric, we also consider the neighborhood difference map $K_i'$, which is defined the same as $K_i$ in equation (1), except that the roles of $f_i$ and $g_i$ are reversed:

$$K_i'(x,y) = g_i(x,y) \mathbb{1}(5,5) - N[f_i(x,y)], \quad (1)$$

where $g_i(x, y)$ is the element at location (x, y) 221 of the feature map $g_i$, $\mathbb{1}(5,5) \in \mathbb{R}^{5 \times 5}$ is a 5×5 matrix in which every element is 1, $N[f_i(x, y)] \in \mathbb{R}^{5 \times 5}$ is the 5×5 neighborhood of $f_i$ centered at (x, y).

This yields 50 neighborhood difference maps 230, $\{K_i\}_{i=1}^{25}$ and $\{K_i'\}_{i=1}^{25}$, each of which has size 12×37×5×5. These neighborhood difference maps are passed through a rectified linear unit (ReLu) and then passed as input to the patch summary layer 106.

Patch Summary Features

In the cross input neighborhood differences layer, we determined a rough relationship among features from the two input images in the form of the neighborhood difference maps. The patch summary layer 106 produces a summary of these neighborhood difference maps as a holistic representation of the differences in each 5×5 block. This layer performs the mapping from $K \in \mathbb{R}^{12 \times 37 \times 5 \times 5 \times 25} \to L \in \mathbb{R}^{12 \times 37 \times 25}$.

This is accomplished by convolving K with 25 filters of size 5×5×25, with a stride of 5. By exactly matching the stride to the width of the square blocks, we ensure that the 25-dimensional summary vector at location (x, y) 242 of L is determined only from the 25 blocks $K_i(x, y)$, i.e., from the 5×5 grid square (x, y) 231 of each neighborhood difference map $K_i$ (where $1 \leq i \leq 25$). Because these are determined only from the local neighborhood of location (x, y) 221 in the feature maps $f_i$ and $g_i$, the 25-dimensional patch summary feature vector at location (x, y) 242 of L provides a high-level summary of the cross-input differences in the neighborhood of location (x, y). The entire patch summary feature map, L, thus provides a high-level summary of the local cross-input neighborhood differences across the entire images.

We also determine a patch summary feature map L' from K' in the same way that we determined L from K. Note that filters for the mapping K'→L' may be different from those for the mapping K→L. (They are not tied, unlike the filters in the first two convolutional layers of the network.) Both patch summary feature maps L and L' 240 are later passed through a ReLu.

Across-Patch Features

From the previous layers, we have obtained a high-level representation of differences within a local neighborhood by determining the cross-input neighborhood difference maps and then obtaining a high-level local representation of these cross-input neighborhood difference maps.

In the third convolutional layer 107, we determine spatial relationships across neighborhood differences. This is done by convolving L with, e.g., 25 filters of, e.g., size 3×3×25 with a stride of 1. The resulting output is a set of 25 feature maps, each of which is of, e.g., size 10×35. These feature maps are passed through the third max pooling layer 108 to reduce the height and width by a factor of 2. This yields 25 high-level feature maps of size 5×18, which we denote M∈ $\mathbb{R}^{5 \times 18 \times 25}$. We similarly obtain 25 high-level feature maps M' from L', resulting in a total of 50 high-level feature maps 250. Convolutional filters for the mapping L→M are not tied to the convolutional filters for the mapping L'→M'.

Higher-Order Relationships

We next apply a fully connected layer 109 to the feature maps M and M'. This characterizes higher-order relationships by combining information from patches that are far from each other, and combining information from M with information from M'. The resultant high-level feature vector 260 of, e.g., length 500 is passed through a ReLu.

Another fully connected layer 110 maps the resulting 500-element feature vector to two outputs representing the same person (positive pair) and different person (negative pair) scores. These two outputs are passed through a softmax layer 111 which yields as the final signal 9 a probability of the two images being the same person (positive pair) and a probability of the two images being different people (negative pair), where these probabilities sum to 1. The softmax function, or normalized exponential, is a generalization of a logistic function that reduces an N-dimensional vector of arbitrary real values to an N-dimensional vector of real values in the range (0, 1) such that the values sum to 1.

In an alternative embodiment, the final fully connected layer 110 and softmax layer 111 are removed from the network. Instead, the high-level feature vector 260 is used as the output of the network and is then input to a classifier, for example a linear Support Vector Machine (SVM) binary classifier. The output of this classifier is then used as the final signal 9 to determine whether the input pair of images was a positive pair or a negative pair. In one embodiment, the input to the classifier is the high-level feature vector 260 after the ReLu is applied; in another embodiment, the input to the classifier is the high-level feature vector before the ReLu is applied.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for re-identification of objects, comprising steps:
    obtaining a pair of images, wherein each image represents an object;
    applying a convolutional neural network (CNN) to the pair of images, wherein the CNN comprises:
    a first convolutional layer;
    a first max pooling layer, which follows the first convolutional layer, wherein the first convolutional layer and the first max pooling layer are applied to each image separately to determine a feature map for each image;
    a cross-input neighborhood differences layer, which is applied to the feature maps to produce neighborhood difference maps;
    a patch summary layer, which is applied to the neighborhood difference maps to produce patch summary feature maps;
    a first fully connected layer, which is applied to the patch summary feature maps to produce a feature vector representing higher order relationships in the patch summary feature maps;
    a second fully connected layer, which is applied to the feature vector representing higher order relationships to produce two scores representing positive pair and negative pair classes;
    a softmax layer, which is applied to the two scores to produce positive pair and negative pair probabilities; and
    outputting the positive pair probability to signal whether the two images represent the same object or not, wherein the steps are performed in a processor.

2. The method of claim 1, wherein the objects are persons, and the method is for person re-identification.

3. The method of claim 1, wherein the network does not include the second fully connected layer nor the softmax layer, wherein the method further comprises using the feature vector representing higher order relationships as input to a classifier, and wherein the outputting comprises outputting a result of the classifier.

4. The method of claim 3, wherein the classifier is a linear support vector machine (SVM) classifier.

5. The method of claim 3, wherein the feature vector representing higher order relationships is passed through a rectified linear unit (ReLu) before being used as input to a classifier.

6. The method of claim 1, wherein a positive pair is defined as two images of the same object, and a negative pair is defined as two images of different objects.

7. The method of claim 1, wherein positive pair refers to two images from the same object class, negative pair refers to two images from different object classes, and wherein, instead of signaling whether the two images represent the same object or not, the outputting signals whether the two images represent the same object class or not.

8. The method of claim 1, further comprising:
    obtaining the pair of images by a camera.

9. The method of claim 1, wherein the CNN further comprises:
    a second convolutional layer; and
    a second max pooling layer, which follows the second convolutional layer, wherein the second convolutional layer takes as input the feature maps determined by the first max pooling layer, the second max pooling layer outputs refined feature maps, and the cross-input neighborhood differences layer is applied to the refined feature maps to produce neighborhood difference maps.

10. The method of claim 9, wherein the first and second convolutional layers are tied by weights shared across the pair of images, to ensure that identical filters are applied to each image.

11. The method of claim 1, wherein the CNN further comprises:
    a third convolutional layer; and
    a third max pooling layer, which follows the third convolutional layer, wherein the third convolutional layer is applied to the patch summary feature maps, the third max pooling layer outputs high-level feature maps, and the first fully connected layer is applied to the high-level feature maps to produce the feature vector representing higher order relationships.

12. The method of claim 1, wherein the first convolutional layer is tied by weights shared across the pair of images, to ensure that identical filters are applied to each image.

13. The method of claim 1, wherein the network is trained with example positive pairs and negative pairs.

14. The method of claim 1, wherein the cross-input neighborhood differences layer accumulates differences in feature values around a neighborhood of each feature location across the two images.

15. The method of claim 1, wherein the neighborhood difference maps are passed through a rectified linear unit (ReLu) before being used as input to the following layer.

16. The method of claim 1, wherein the patch summary feature maps are passed through a rectified linear unit (ReLu) before being used as input to the following layer.

17. The method of claim 1, wherein the feature vector representing higher order relationships is passed through a rectified linear unit (ReLu) before being used as input to the following layer.

* * * * *